United States Patent
Han et al.

(10) Patent No.: US 8,111,745 B2
(45) Date of Patent: Feb. 7, 2012

(54) METHOD AND APPARATUS FOR ENCODING AND DECODING VIDEO SIGNAL ACCORDING TO DIRECTIONAL INTRA-RESIDUAL PREDICTION

(75) Inventors: Woo-jin Han, Suwon-si (KR); Sang-chang Cha, Hwaseong-si (KR); Kyo-hyuk Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1600 days.

(21) Appl. No.: 11/490,199

(22) Filed: Jul. 21, 2006

(65) Prior Publication Data
US 2007/0025439 A1    Feb. 1, 2007

Related U.S. Application Data (60) Provisional application No. 60/702,295, filed on Jul. 26, 2005, provisional application No. 60/701,037, filed on Jul. 21, 2005.

(30) Foreign Application Priority Data

Nov. 18, 2005  (KR) .................. 10-2005-0110927

(51) Int. Cl.
*H04N 7/12*    (2006.01)

(52) U.S. Cl. ................. 375/240.01; 375/240.24

(58) Field of Classification Search ............. 375/240.12, 375/240.24
See application file for complete search history.

(56) References Cited

U.S. PATENT DOCUMENTS

| | | | |
|---|---|---|---|
| 6,614,936 B1 | 9/2003 | Wu et al. | |
| 6,788,740 B1* | 9/2004 | van der Schaar et al. | 375/240 |
| 7,881,384 B2* | 2/2011 | Cote et al. | 375/240.16 |
| 7,929,610 B2* | 4/2011 | Sun | 375/240.16 |
| 2002/0150158 A1* | 10/2002 | Wu et al. | 375/240.12 |
| 2004/0101052 A1 | 5/2004 | Roh | |
| 2005/0147164 A1* | 7/2005 | Wu et al. | 375/240.12 |
| 2006/0013320 A1* | 1/2006 | Oguz et al. | 375/240.27 |
| 2006/0126962 A1* | 6/2006 | Sun | 382/268 |
| 2006/0153295 A1* | 7/2006 | Wang et al. | 375/240.08 |
| 2006/0268991 A1* | 11/2006 | Segall et al. | 375/240.24 |
| 2007/0211798 A1* | 9/2007 | Boyce et al. | 375/240.16 |

FOREIGN PATENT DOCUMENTS

| | | |
|---|---|---|
| EP | 1442602 A | 8/2004 |
| WO | 03036979 A1 | 5/2003 |

\* cited by examiner

*Primary Examiner* — Jayanti K Patel
*Assistant Examiner* — Jessica Prince
(74) *Attorney, Agent, or Firm* — Sughrue Mion, PLLC

(57) ABSTRACT

A method and apparatus for encoding and decoding a video signal according to directional intra-residual prediction. The video encoding method of the present invention includes calculating first residual data by performing directional intra-prediction on a first block of a base layer with reference to a second block of the base layer, calculating second residual data by performing directional intra-prediction on a third block of an enhancement layer that corresponds to the first block of the base layer with reference to a fourth block of the enhancement layer that corresponds to the second block of the base layer, and encoding the third block according to the directional intra-residual prediction by obtaining third residual data that is a difference between the first residual data and the second residual data.

38 Claims, 9 Drawing Sheets

Conventional Intra-Prediction Directions

FIG. 5B

Extended Intra-Prediction Directions

METHOD AND APPARATUS FOR ENCODING AND DECODING VIDEO SIGNAL ACCORDING TO DIRECTIONAL INTRA-RESIDUAL PREDICTION

CROSS-REFERENCE TO RELATED APPLICATIONS

This application claims priority from Korean Patent Application No. 10-2005-0110927 filed on Nov. 18, 2005 in the Korean Intellectual Property Office, and U.S. Provisional Patent Application Nos. 60/702,295 and 60/701,037 filed on Jul. 26, 2005 and Jul. 21, 2005 in the United States Patent and Trademark Office, respectively, the disclosures of which are incorporated herein by reference in their entirety.

BACKGROUND OF THE INVENTION

1. Field of the Invention

Methods and apparatuses consistent with the present invention relate to video encoding and decoding and, more particularly, to encoding and decoding a video signal according to a directional intra-residual prediction.

2. Description of the Prior Art

Since multimedia data that includes text, moving pictures (hereinafter referred to as "video") and audio is typically large, mass storage media and wide bandwidths are required for storing and transmitting the data. Accordingly, compression coding techniques are required to transmit the multimedia data. Among multimedia compression methods, video compression methods can be classified into lossy/lossless compression, intraframe/interframe compression, and symmetric/asymmetric compression, depending on whether source data is lost, whether compression is independently performed for respective frames, and whether the same time is required for compression and reconstruction, respectively. In the case where frames have diverse resolutions, the corresponding compression is called scalable compression.

The purpose of conventional video coding is to transmit information that is optimized to a given transmission rate. However, in a network video application such as an Internet streaming video, the performance of the network is not constant, but varies according to circumstances, and thus flexible coding is required in addition to coding optimized to the specified transmission rate.

Scalability refers to the ability of a decoder to selectively decode a base layer and an enhancement layer according to processing conditions and network conditions. In particular, fine granularity scalability (FGS) methods encode the base layer and the enhancement layer, and the enhancement layer may not be transmitted or decoded depending on the network transmission efficiency or the state of the decoder side. Accordingly, data can be properly transmitted according to the network transmission rate.

Figure 1:
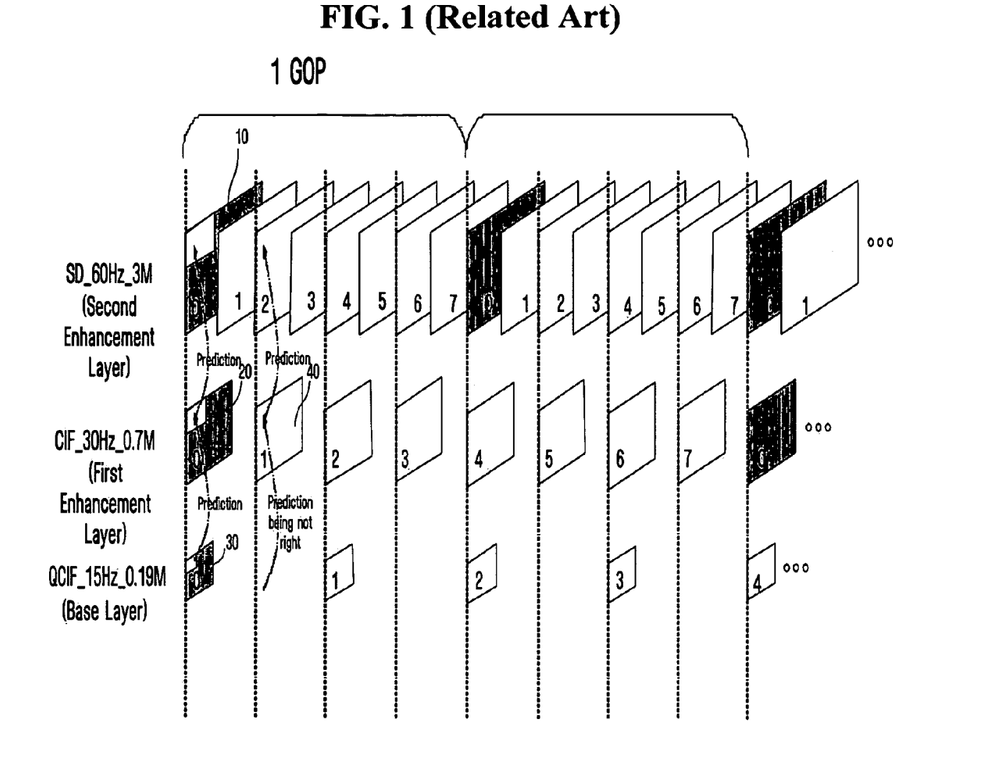
FIG. 1 is a view illustrating an example of a scalable video codec using a multilayer structure.

FIG. 1 illustrates an example of a scalable video codec using a multilayer structure. In this video codec, the base layer is in the Quarter Common Intermediate Format (QCIF) at 15 Hz (frame rate), the first enhancement layer is in the Common Intermediate Format (CIF) at 30 Hz, and the second enhancement layer is in the SD (Standard Definition) format at 60 Hz. If CIF 0.5 Mbps stream is required, the bit stream is truncated to obtain a bit rate of 0.5 Mbps based on a first enhancement layer having a CIF, a frame rate of 30 Hz and a bit rate of 0.7 Mbps. In this method, spatial and temporal SNR scalability can be obtained.

As shown in FIG. 1, frames (e.g., 10, 20 and 30) of respective layers, which have the same temporal position, have images similar to one another. Accordingly, a method of predicting the texture of the current layer and encoding the difference between the predicted value and the actual texture value of the current layer has been proposed. In the Scalable Video Mode 3.0 of ISO/IEC 21000-13 Scalable Video Coding (hereinafter referred to as "SVM 3.0"), such a method is called intra-BL prediction.

According to SVM 3.0, in addition to an inter-prediction and a directional intra-prediction used for prediction of blocks or macroblocks that constitute the current frame in the existing H.264, a method of predicting the current block by using the correlation between the current block and a corresponding lower-layer block has been adopted. This prediction method is called an "intra-BL prediction", and a mode for performing an encoding using such a prediction method is called an "intra-BL mode".

Figure 2:
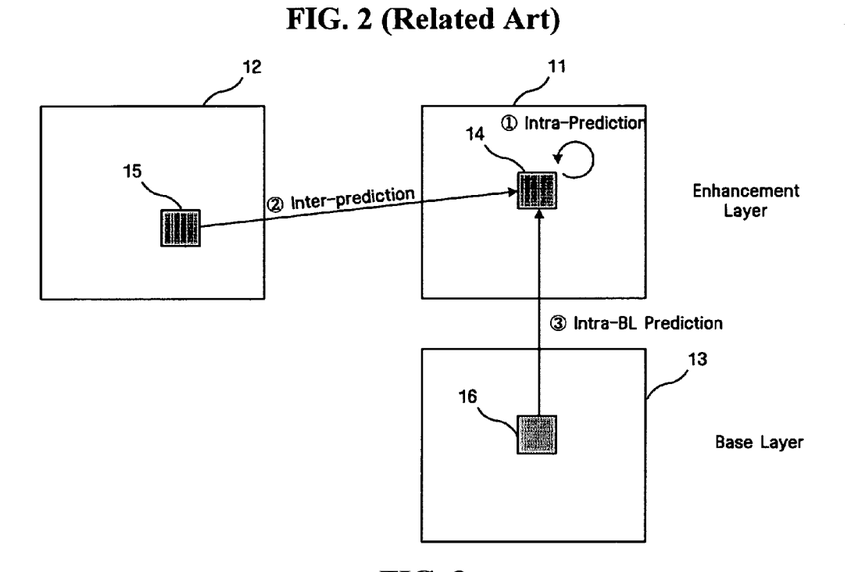
FIG. 2 is a view schematically explaining three prediction methods.

FIG. 2 is a view schematically explaining the above-described three prediction methods. First (①) intra-prediction with respect to a certain macroblock 14 of the current frame 11 is performed, second (②) inter-prediction using a frame 12 that is at a temporal position different from that of the current frame 11 is performed, and third (③) intra-BL prediction is performed using texture data for an area 16 of a base-layer frame 13 that corresponds to the macroblock 14.

In the case of encoding residual data by obtaining the difference between the result of the prediction and a video to be encoded according to the result of the prediction in the temporal inter-prediction, the compression efficiency is increased. In addition, the compression efficiency can be heightened by reducing the amount of data to be encoded by obtaining the difference between the residual data. Consequently, a method and an apparatus for compressing the residual data in the directional intra-prediction are required.

SUMMARY OF THE INVENTION

Accordingly, the present invention has been made to address the above-mentioned problems occurring in the prior art, and an aspect of the present invention is to reduce the size of data to be encoded by obtaining residual data of an enhancement layer based on directional intra-prediction data of a base layer.

Another aspect of the present invention is to reduce the amount of data to be encoded and to increase the compression efficiency while performing intra-prediction by reducing the size of symbols to be allocated to directional information that exists in directional intra-prediction data.

Additional aspects of the invention will be set forth in part in the description which follows and in part will become apparent to those having ordinary skill in the art upon examination of the following or may be learned from practice of the invention.

In order to accomplish these aspects, there is provided a method of encoding a video signal according to a directional intra-residual prediction, according to the present invention, which includes calculating first residual data by performing directional intra-prediction on a first block of a base layer with reference to a second block of the base layer; calculating second residual data by performing directional intra-prediction on a third block of an enhancement layer that corresponds to the first block of the base layer with reference to a fourth block of the enhancement layer that corresponds to the second block of the base layer; and encoding the third block according to the directional intra-residual prediction by obtaining third residual data that is a difference between the first residual data and the second residual data.

In another aspect of the present invention, there is provided a method of decoding a video signal according to a directional intra-residual prediction, which includes extracting third residual data that is directional intra-residual prediction data on a third block of an enhancement layer from a enhancement-layer residual stream; extracting first residual data that is the result of performing directional intra-prediction on a first block of a base layer corresponding to the third block from a base-layer residual stream; calculating second residual data that is the result of performing directional intra-prediction on the third block by adding the third residual data and the first residual data; and restoring the third block using the second residual data.

In still another aspect of the present invention, there is provided a video encoder for encoding a video signal according to a directional intra-residual prediction, which includes a base-layer intra-prediction unit calculating first residual data by performing directional intra-prediction on a first block of a base layer with reference to a second block of the base layer; an enhancement-layer intra-prediction unit calculating second residual data by performing directional intra-prediction on a third block of an enhancement layer that corresponds to the first block of the base layer with reference to a fourth block of the enhancement layer that corresponds to the second block of the base layer; and a residual encoding unit encoding the third block according to the directional intra-residual prediction by obtaining third residual data that is a difference between the first residual data and the second residual data.

In still another aspect of the present invention, there is provided a video decoder for decoding a video signal according to a directional intra-residual prediction, which includes a residual decoding unit extracting third residual data that is directional intra-residual prediction data on a third block of an enhancement layer from a enhancement-layer residual stream; a base-layer residual decoding unit extracting first residual data that is the result of performing directional intra-prediction on a first block of a base layer corresponding to the third block from a base-layer residual stream; an enhancement-layer residual decoding unit calculating second residual data that is the result of performing directional intra-prediction on the third block by adding the third residual data and the first residual data; and an enhancement-layer decoding unit restoring the third block using the second residual data.

BRIEF DESCRIPTION OF THE DRAWINGS

The above and other aspects of the present invention will become more apparent from the following detailed description of exemplary embodiments taken in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. The aspects and features of the present invention and methods for achieving the aspects and features will become apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Exemplary embodiments of the present invention will be described with reference to the accompanying drawings illustrating block diagrams and flowcharts for explaining a method and apparatus for encoding and decoding a video signal according to directional intra-residual prediction according to the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

Figure 3:
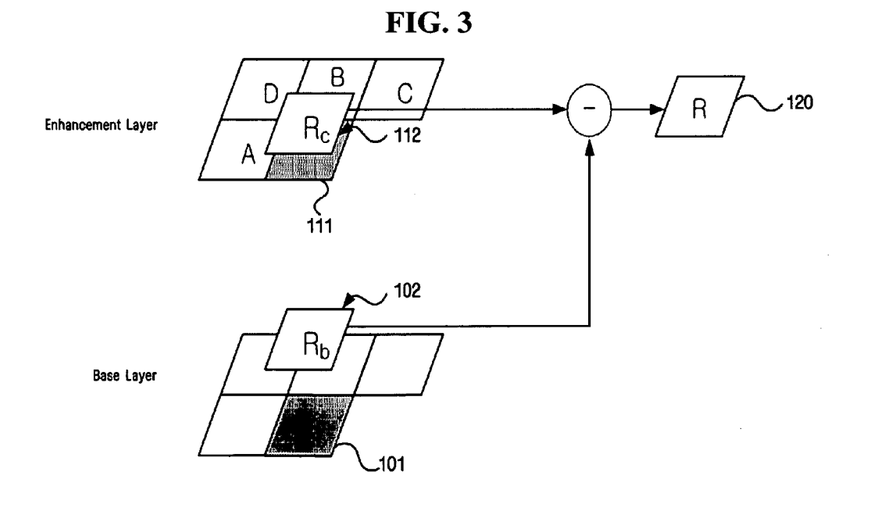
FIG. 3 is a view explaining a process of obtaining a difference between residual data generated by performing intra-prediction on an enhancement layer and a base layer, respectively.

FIG. 3 is a view explaining a process of obtaining a difference between residual data generated by performing directional intra-prediction on an enhancement layer and on a base layer, respectively. Residual data (Rb) 102 generated by performing directional intra-prediction on a base layer has information on a difference between a block to be predicted and the original block 101 to be encoded. In the case of the directional intra-prediction, the residual data (Rb) 102 includes information on the directionality to be referred to.

Residual data (Rc) 112 is generated by performing directional intra-prediction on a block 111 of an enhancement layer. The residual data (Rc) 112 includes directional information required to refer to a block located in a specified direction for the directional intra-prediction. A decoder side performs a block restoration by selecting a block or pixel to be referred to according to such directional information.

In the base layer and the enhancement layer, there is a high possibility that the residual data according to the intra-prediction of the base layer is similar to the residual data according to the intra-prediction of the enhancement layer. Accordingly, the coding efficiency can be improved by encoding residual prediction data (R) 120 obtained from the difference between the residual data Rb of the base layer and the residual data Rc of the enhancement layer, rather than by encoding the residual data Rc obtained by performing the directional intra-prediction on the block of the enhancement layer as it is.

Figure 4:
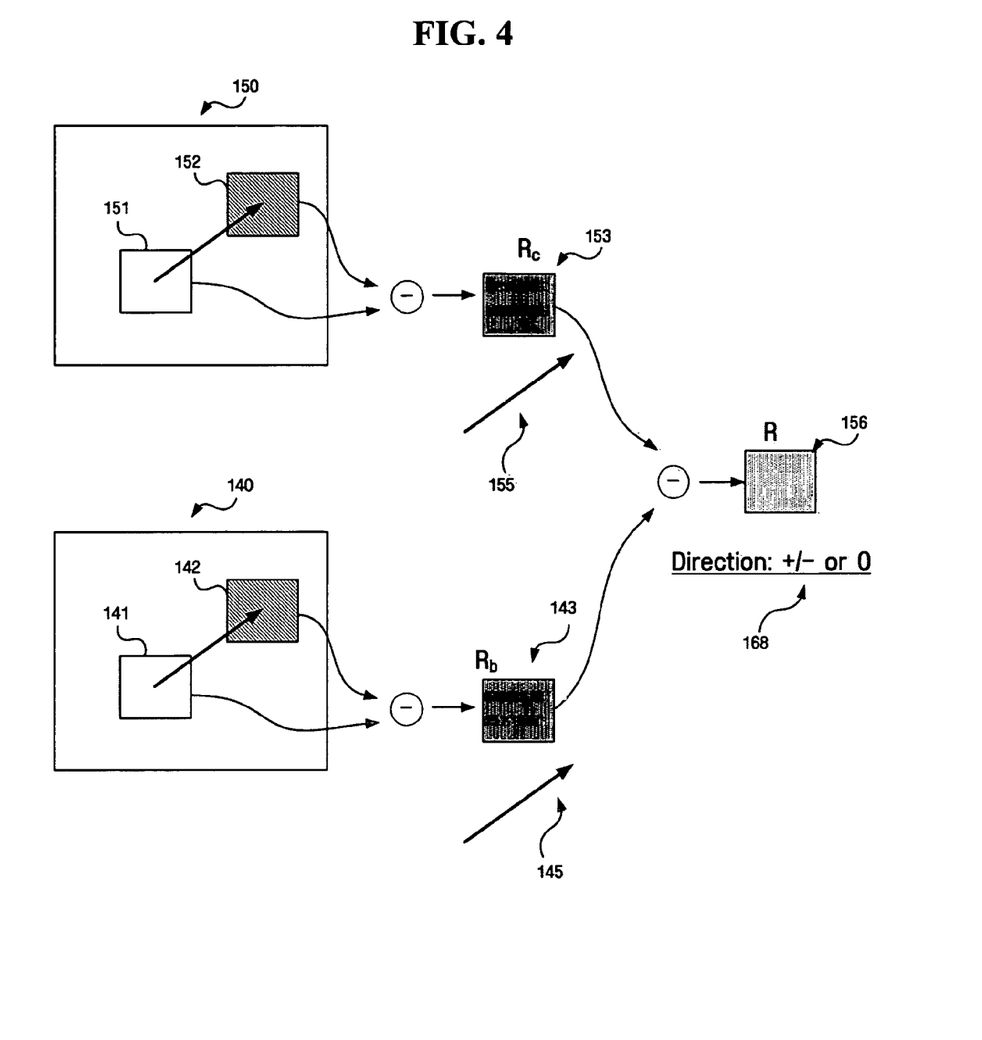
FIG. 4 is a view illustrating a residual difference mechanism of directional intra-prediction according to an exemplary embodiment of the present invention.

FIG. 4 is a view illustrating a residual difference mechanism of a directional intra-prediction according to an exemplary embodiment of the present invention. In a specified frame or slice 150 of the enhancement layer, a block or pixel 151 to be encoded exists. Also, a block or pixel 141 exists in a frame 140 of the base layer. Residual data (Rb) 143 is generated by performing the directional intra-prediction on the block or pixel 141 of the base layer with reference to a block (or pixel) 142. In this case, the residual data includes directional information 145 for referring to the block 142.

Meanwhile, residual data (Rc) 153 is generated by performing the directional intra-prediction on the block or pixel 151 of the enhancement layer that corresponds to the block 141 of the base layer with reference to a block 152 that corresponds to the block 142 of the base layer. The residual data includes directional information 155 for referring to the block 152. Here, the directional information 155 whereby the block 151 refers to the block 152 is the same as or similar to the directional information 145 whereby the block 141 refers to the block 142. This is because their relative locations are the same or similar to each other. Also, there is a high probability that their texture residuals are similar to each other. In order to remove this similarity between the information, directional intra-residual prediction may be performed by obtaining residual prediction data (R) 156 that is the difference between the residual data (Rc) 153 and the residual data (Rb) 143. In the case of the directional information, a directional intra-residual prediction can be performed by obtaining the difference 168 between the directional information 145 according to the intra-prediction of the base layer and the directional information 155 according to the intra-prediction of the enhancement layer.

In performing the directional intra-residual prediction as illustrated in FIGS. 3 and 4, a multilayer intra-prediction may be performed by a residual prediction of a directional intra-prediction mode. It can be recognized using a residual prediction flag whether the enhancement layer will refer to the directional intra-prediction information of the base layer. Also, it can be recognized using a base-layer flag (blflag) whether the direction of the residual layer has been reused in the enhancement layer. For example, if the base-layer flag (blflag) is "1", the directional information of the base layer can be reused. If the directional information of the base layer is different from the directional information of the enhancement layer, it can be used after the directional information is adjusted according to a qpel flag.

In this case, the residual prediction flag used in the temporal inter-prediction and the qpel flag can be used.

On the other hand, the directions of the existing intra-prediction can be extended in order to perform the directional intra-residual prediction as illustrated in FIGS. 3 and 4. In this case, a more accurate directional prediction is performed, and the difference between the directional predictions in the enhancement layer that refers to the corresponding directional prediction becomes exquisite, so that the encoding efficiency of the directional intra-prediction result can be heightened.

Figure 5A:
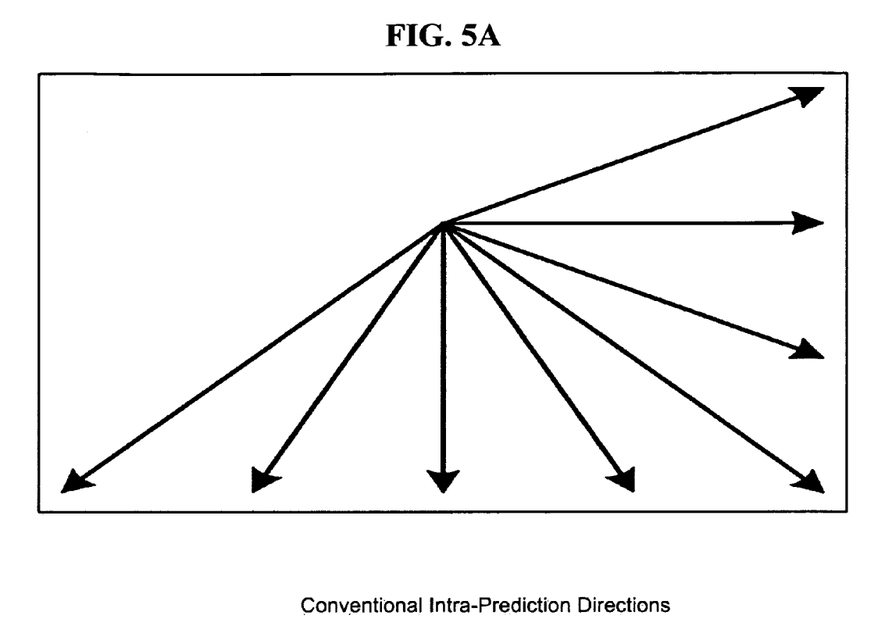
FIGS. 5A and 5B are views explaining existing intraprediction directions and extended intra-prediction directions according to an exemplary embodiment of the present invention.
Figure 5B:
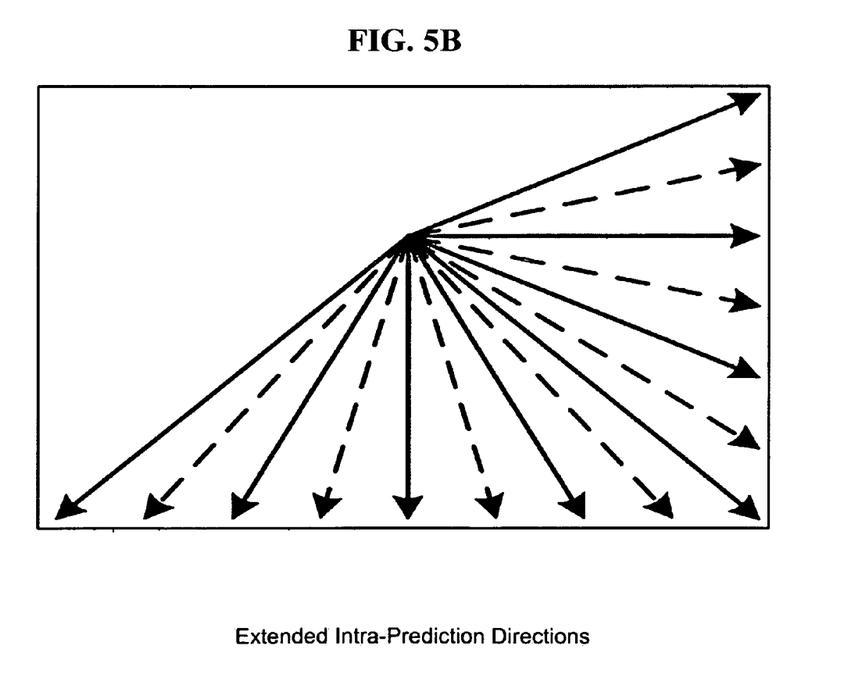

FIGS. 5A and 5B are views explaining existing intraprediction directions and extended intra-prediction directions according to an exemplary embodiment of the present invention, respectively.

The directional intra-prediction proposed in the H.264 specifications has 9 intra-prediction directions including 8 directions as illustrated in the drawing and DC. The extended directional intra-prediction proposed according to the exemplary embodiment of present invention has 7 additional intra-prediction directions, thus the entire number of intra-prediction directions becomes 16. By adding information on intraBL4×4 to the 16 directions, the number of intra-prediction directions becomes 17 in total. According to the extended intra-prediction proposed according to the exemplary embodiment of the present invention, information, which can be hardly indicated by the existing directionality, is indicated through the extended directionality, and thus the performance of the intra-prediction is improved. As a result, the intra-prediction can be applied in the case where the intra-BL for the base layer fails to have a high compression rate due to the difference in resolution or quantization size between the base layer and the enhancement layer.

Figure 6:
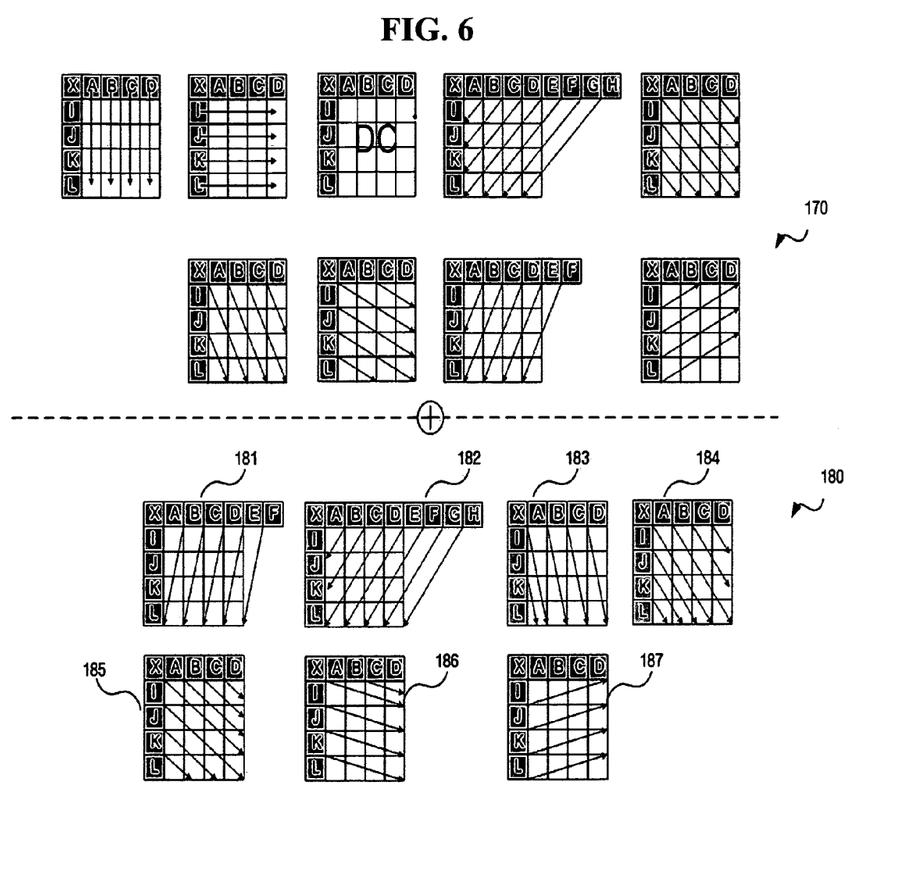
FIG. 6 is a view explaining relations among blocks which are referred to based on the extended intra-prediction according to an exemplary embodiment of the present invention.

FIG. 6 is a view explaining relations among blocks that are referred to based on the extended intra-prediction as described above according to an exemplary embodiment of the present invention. Reference numeral 170 shows blocks that are referred to for the intra-prediction in the conventional H.264. According to the extended intra-prediction, adjacent blocks indicated as a reference numeral 180 are referred to according to the extended intra-prediction directions as shown in FIG. 5B. In this case, it is required to give weightings to adjacent pixels. Blocks 181, 182, 183, 184, 185, 186, and 187 show the relations among the adjacent pixels that are referred to during the extended intra-prediction. The blocks as illustrated in FIG. 6 include subblocks.

Figure 7:
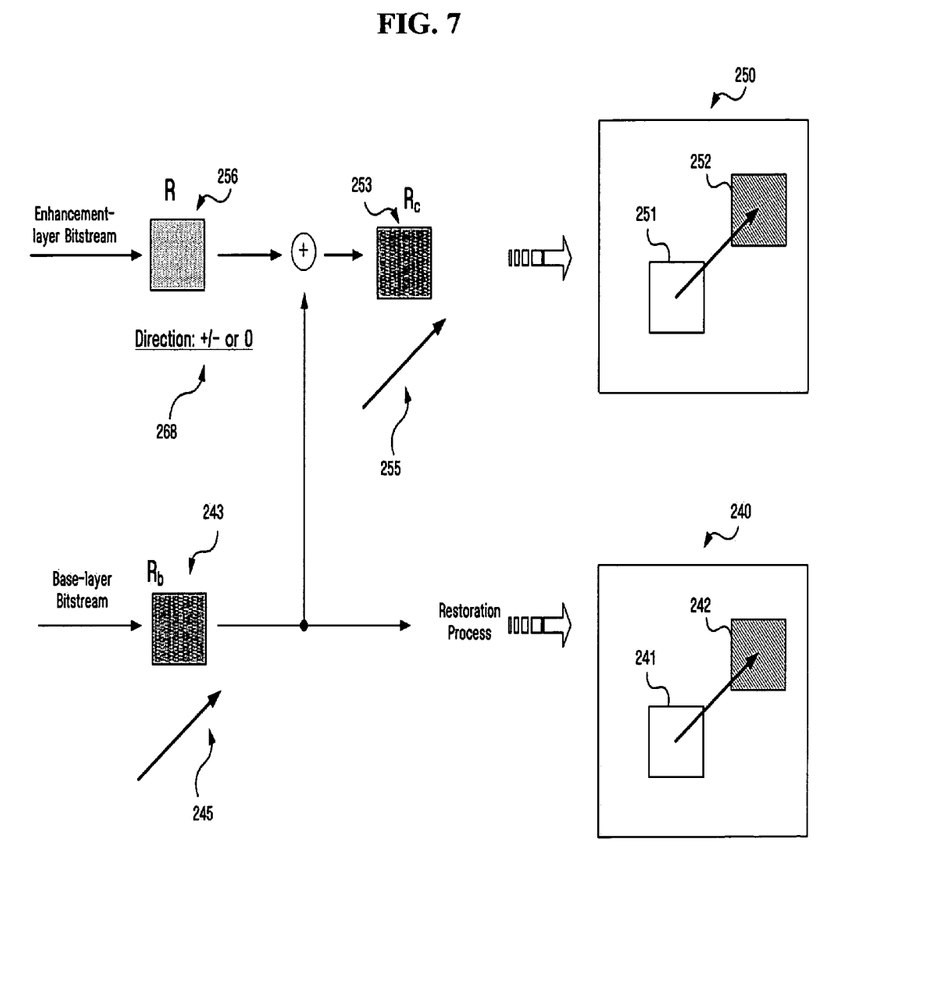
FIG. 7 is a view explaining a process of decoding video data according to directional intra-residual prediction according to an exemplary embodiment of the present invention.

FIG. 7 is a view explaining a process of decoding video data according to a directional intra-residual prediction according to an exemplary embodiment of the present invention. Residual prediction data (R) 256 and residual data (Rb) 243 are included in an enhancement-layer bitstream and a base-layer bitstream, respectively. (R) 256 includes the result of subtracting the residual data of the base layer from the residual data of the enhancement layer according to the directional intra-residual prediction. Also, (R) 256 includes a difference value 268 between the directionality of the enhancement layer and the directionality 245 of the base layer. Residual data (Rc) 253 for the directional intra-prediction on the enhancement layer can be restored by adding (Rb) 243 and (R) 256. The residual data 253 also includes information on the directionality 255. A block 241 of a base-layer frame 240 can be restored by performing the decoding in accordance with the typical directional intra-prediction using (Rb) 243. The block 241 refers to a block 242. A block 251 of an enhancement-layer frame 250 can be restored through a restoration process using (Rc) 253. The block 251 refers to a block 252.

Figure 8:
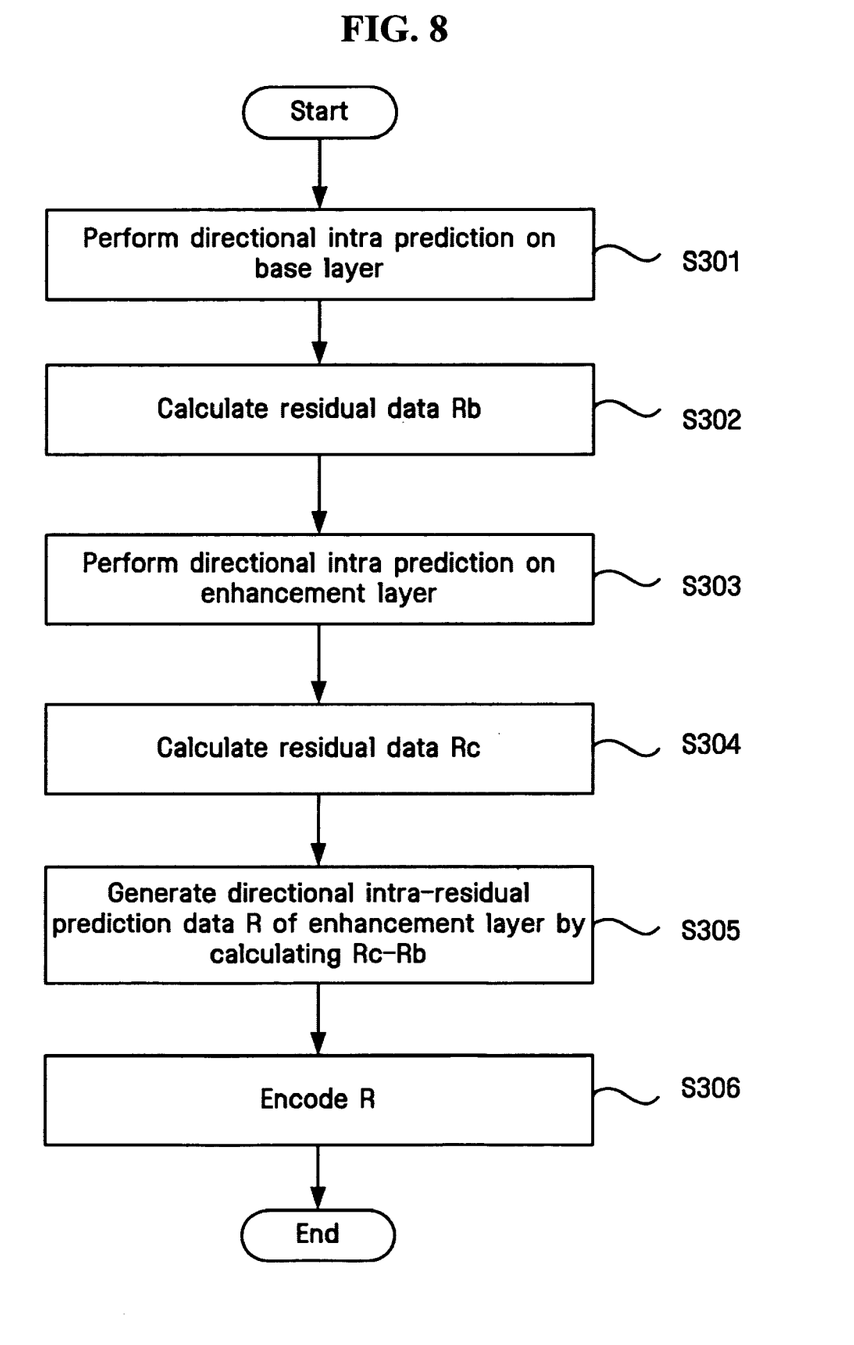
FIG. 8 is a flowchart illustrating an encoding process according to directional intra-residual prediction according to an exemplary embodiment of the present invention.

FIG. 8 is a flowchart illustrating an encoding process according to a directional intra-residual prediction according to an exemplary embodiment of the present invention.

First, a direction intra-prediction is performed on the base layer (S301). That is, as illustrated in FIG. 4, the directional intra-prediction is performed on the first block (141 in FIG. 4) of the base layer with reference to the second block (142 in FIG. 4) in the same frame as the first block of the base layer. Then, the residual data Rb (143 in FIG. 4) is calculated as the result of the prediction (S302).

Meanwhile, a directional intra-prediction is performed on the enhancement layer (S303). That is, the directional intra-prediction is performed on the third block (151 in FIG. 4) of the enhancement layer that corresponds to the first block (141 in FIG. 4) of the base layer with reference to the fourth block (152 in FIG. 4) of the enhancement layer that corresponds to the second block (142 in FIG. 4) of the base later. Then, the residual data Rc (153 in FIG. 4) is calculated as the result of the prediction (S304).

The directional intra-residual prediction data R (156 in FIG. 4) on the enhancement layer is generated by calculating Rc−Rb S305. Then, the residual data R is encoded and then transmitted to the decoder side (S306).

The above-described extended directional intra-prediction can be performed based on the third direction that exists between two adjacent directions used for the conventional directional intra-prediction.

Figure 9:
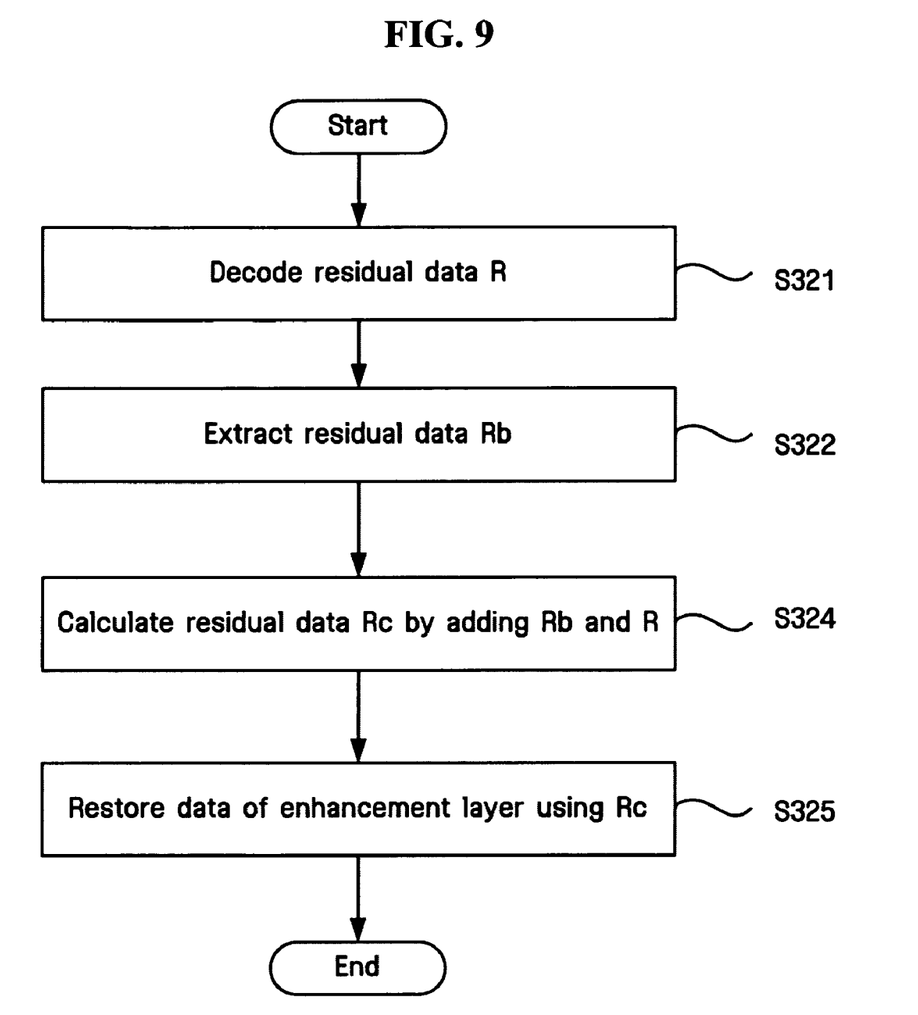
FIG. 9 is a flowchart illustrating a decoding process according to directional intra-residual prediction according to an exemplary embodiment of the present invention.

FIG. 9 is a flowchart illustrating a decoding process according to a directional intra-residual prediction according to an exemplary embodiment of the present invention. The decoding process will now be explained with reference to FIGS. 7 and 9.

The residual data R (256 in FIG. 7) that is the result of the directional intra-residual prediction is decoded (S321). Also, the residual data Rb (243 in FIG. 7) that is the result of the intra-prediction performed on the block (241 in FIG. 7) of the base layer, which the block (251 in FIG. 7) to be finally restored through the residual data R refers to, is extracted (S322). Then, the residual data Rc (253 in FIG. 7) that is the result of the intra-prediction on the enhancement layer is calculated by adding Rb and R (S324). Then, the data of the enhancement layer is restored using Rc (S325).

As described above, the residual date can be exquisitely predicted by performing the extended directional intra-prediction based on the third direction that exists between two adjacent directions used for the conventional directional intra-prediction.

Figure 10:
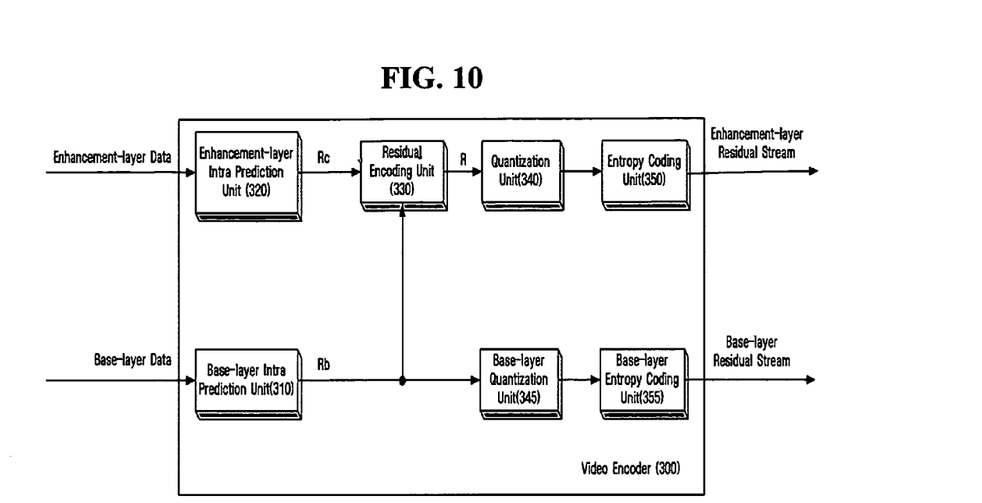
FIG. 10 is a block diagram illustrating the construction of a video encoder according to an exemplary embodiment of the present invention.

FIG. 10 is a block diagram illustrating the construction of a video encoder according to an exemplary embodiment of the present invention.

Referring to FIG. 10, the video encoder 300 includes an enhancement-layer intra-prediction unit 320 for generating a residual stream for the enhancement-layer data, a residual encoding unit 330, a quantization unit 340, an entropy coding unit 350, a base-layer intra-prediction unit 310 for generating a residual stream for the base-layer data, a base-layer quantization unit 345, and a base-layer entropy coding unit 355.

Referring to FIG. 4, the base-layer intra-prediction unit 310 performs the directional intra-prediction on the first block (141 in FIG. 4) of the base layer with reference to the second block (142 in FIG. 4) in the same frame as the first block of the base layer, resulting in that the residual data Rb (143 in FIG. 4) is generated. This residual data is encoded through the base-layer quantization unit 345 and the base-layer entropy coding unit 355, and then the encoded residual data is transmitted to the decoder side.

Meanwhile, the enhancement-layer intra-prediction unit performs the directional intra-prediction on the third block (151 in FIG. 4) that corresponds to the first block (141 in FIG. 4) of the base layer. In this case, the fourth block (152 in FIG. 4) of the enhancement layer that corresponds to the second block (142 in FIG. 4) becomes the reference block. As the result of performing the directional intra-prediction, the residual data Rc is generated.

The residual encoding unit 330 generates R that is the result of the directional intra-residual prediction by obtaining Rc and Rb. The value R is encoded through the quantization unit 340 and the entropy coding unit 350.

Since the quantization process and the entropy coding as illustrated in FIG. 10 have also been used in the conventional video encoder, the detailed explanation thereof will be omitted.

In the case of applying the above-described extended directional intra-prediction, the enhancement-layer intra-prediction unit 320 and the base-layer intra-prediction unit 310 can perform the directional intra-prediction based on the third direction that exists between two adjacent directions used for the conventional directional intra-prediction.

Figure 11:
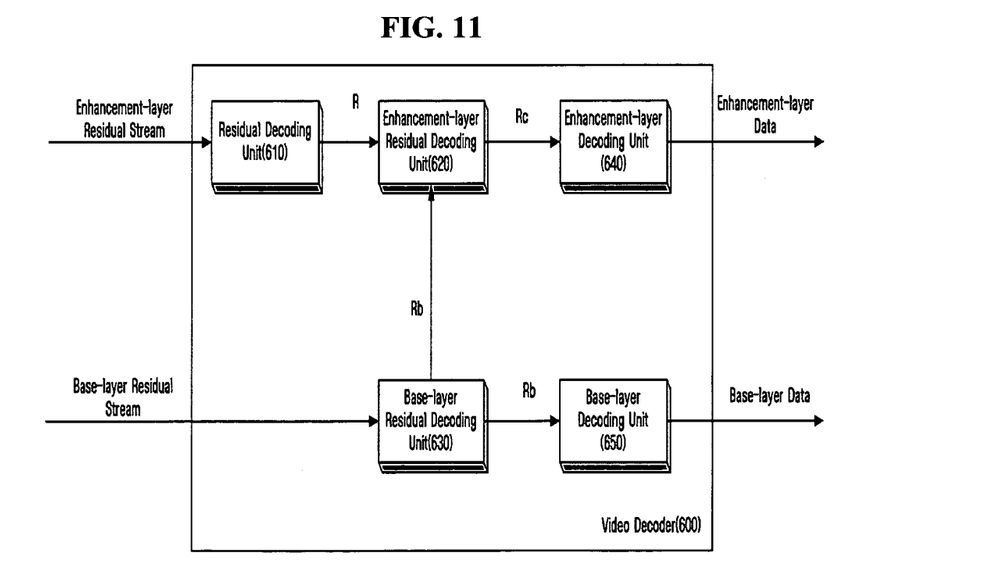
FIG. 11 is a block diagram illustrating the construction of a video decoder according to an exemplary embodiment of the present invention.

FIG. 11 is a block diagram illustrating the construction of a video decoder according to an exemplary embodiment of the present invention.

Referring to FIG. 11, the video decoder 600 includes a residual decoding unit 610 for restoring the enhancement-layer residual stream to the enhancement-layer video data, an enhancement-layer residual decoding unit 620, and an enhancement-layer decoding unit 640. The video decoder also includes a base-layer residual decoding unit 630 and a base-layer decoding unit 650.

The residual decoding unit 610 extracts the residual data R (256 in FIG. 7) that is the direction intra-residual prediction data on the third block (251 in FIG. 7) of the enhancement layer. The base-layer residual decoding unit 630 extracts the residual data Rb, which is the result of performing the directional intra-prediction on the first block (241 in FIG. 7) corresponding to the third block, from the base-layer residual stream.

The enhancement-layer residual decoding unit 620 calculates the residual data Rc that is the result of performing the directional intra-prediction on the third block (251 in FIG. 7) by adding R and Rb. The calculated residual data is inputted to the enhancement-layer decoding unit 640 so as to be restored to the video data.

The base-layer decoding unit 650 also restores the video data using the residual data Rb.

Since the restoration process as illustrated in FIG. 11 has also been used in the conventional video decoder, the detailed explanation thereof will be omitted.

In the case of applying the above-described extended directional intra-prediction, the enhancement-layer decoding unit 640 and the base-layer decoding unit 650 can restore the video data based on the third direction that exists between the two adjacent directions used for the conventional directional intra-prediction.

As described above, according to the exemplary embodiments of the present invention, the decoding can be efficiently performed without changing the multi-loop decoding process.

Also, in the case of performing the directional intra-prediction on the enhancement layer, the coding size of symbols to be allocated to the directional information can be markedly reduced, and the directional information can be adjusted with reference to the directional information of the base layer.

The residual prediction flag and the base-layer flag currently used in the temporal inter-prediction can also be used in the directional intra-prediction.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention is defined by the appended claims and their legal equivalents.

What is claimed is:

1. A method of encoding a video signal according to directional intra-residual prediction, comprising:
   calculating first residual data by performing directional intra-prediction on a first block of a base layer with reference to a second block of the base layer;
   calculating second residual data by performing directional intra-prediction on a third block of an enhancement layer that corresponds to the first block of the base layer with reference to a fourth block of the enhancement layer that corresponds to the second block of the base layer; and
   encoding the third block according to the directional intra-residual prediction by obtaining third residual data that is a difference between the first residual data and the second residual data.

2. The method of claim 1, wherein the encoding of the third block comprises encoding of the third residual data.

3. The method of claim 1, wherein the first residual data is a difference value between the first block and the second block, and comprises directional information of the second block.

4. The method of claim 1, wherein the second residual data is a difference value between the third block and the fourth block, and comprises directional information of the fourth block.

5. The method of claim 1, wherein the third residual data comprises a difference between directional information included in the first residual data and directional information included in the second residual data.

6. The method of claim 1, wherein the third residual data comprises information on a residual prediction mode that indicates the directional intra-residual prediction.

7. The method of claim 1, wherein the third residual data comprises flag information that indicates whether to reuse directional information included in the first residual data.

8. The method of claim 1, wherein the third residual data comprises flag information that indicates whether to adjust and use directional information included in the first residual data.

9. The method of claim 1, wherein at least one of the second block and the fourth block exists in a third direction which is between a first direction and a second direction, which are adjacent to each other, for use in the directional intra-prediction.

10. The method of claim 9, wherein the first and second directions are determined according to H.264 intraprediction standard.

11. A method of decoding a video signal according to directional intra-residual prediction, comprising:
    extracting third residual data that is directional intra-residual prediction data on a third block of an enhancement layer from an enhancement-layer residual stream;
    extracting first residual data that is a result of performing directional intra-prediction on a first block of a base layer corresponding to the third block from a base-layer residual stream;
    calculating second residual data that is a result of performing directional intra-prediction on the third block by adding the third residual data and the first residual data; and
    restoring the third block using the second residual data.

12. The method of claim 11, wherein the first residual data is a difference value between the first block and a second block that the first block refers to according to the directional intra-prediction, and comprises directional information of the second block.

13. The method of claim 11, wherein the second residual data is a difference value between the third block and a fourth block that the third block refers to according to the directional intra-prediction, and comprises directional information of the fourth block.

14. The method of claim 11, wherein the third residual data comprises a difference between directional information included in the first residual data and directional information included in the second residual data.

15. The method of claim 11, wherein the third residual data comprises information on a residual prediction mode that indicates the directional intra-residual prediction.

16. The method of claim 11, wherein the third residual data comprises flag information that indicates whether to reuse directional information included in the first residual data.

17. The method of claim 11, wherein the third residual data comprises flag information that indicates whether to adjust and use directional information included in the first residual data.

18. The method of claim 11, wherein the first residual data and the second residual data are obtained with reference to a second block and a fourth block, respectively, and
    wherein at least one of the second block and the fourth block exists in a third direction which is between a first direction and a second direction, which are adjacent to each other, for use in the directional intra-prediction.

19. The method of claim 18, wherein the first and second directions are determined according to H.264 intraprediction standard.

20. A video encoder for encoding a video signal according to a directional intra-residual prediction, the video encoder comprising:
    a base-layer intra-prediction unit which calculates first residual data by performing directional intra-prediction on a first block of a base layer with reference to a second block of the base layer;
    an enhancement-layer intra-prediction unit which calculates second residual data by performing directional intra-prediction on a third block of an enhancement layer which corresponds to the first block of the base layer with reference to a fourth block of the enhancement layer which corresponds to the second block of the base layer; and
    a residual encoding unit which encodes the third block according to the directional intra-residual prediction by obtaining third residual data that is a difference between the first residual data and the second residual data.

21. The video encoder of claim 20, wherein, in encoding the third block, the residual encoding unit is configured to encode the third residual data.

22. The video encoder of claim 20, wherein the first residual data is a difference value between the first block and the second block, and comprises directional information of the second block.

23. The video encoder of claim 20, wherein the second residual data is a difference value between the third block and the fourth block, and comprises directional information of the fourth block.

24. The video encoder of claim 20 wherein the third residual data comprises a difference between directional information included in the first residual data and directional information included in the second residual data.

25. The video encoder of claim 20, wherein the third residual data comprises information on a residual prediction mode that indicates the directional intra-residual prediction.

26. The video encoder of claim 20, wherein the third residual data comprises flag information that indicates whether to reuse directional information included in the first residual data.

27. The video encoder of claim 20, wherein the third residual data comprises flag information that indicates whether to adjust and use directional information included in the first residual data.

28. The video encoder of claim 20, wherein at least one of the second block and the fourth block exists in a third direction that is between a first direction and a second direction, which are adjacent to each other, for use in the directional intra-prediction.

29. The video encoder of claim 28, wherein the first and second directions are determined according to H.264 intra-prediction standard.

30. A video decoder for decoding a video signal according to a directional intra-residual prediction, comprising:
a residual decoding unit which extracts third residual data that is directional intra-residual prediction data on a third block of an enhancement layer from an enhancement-layer residual stream;
a base-layer residual decoding unit which extracts first residual data that is a result of performing directional intra-prediction on a first block of a base layer corresponding to the third block from a base-layer residual stream;
an enhancement-layer residual decoding unit which calculates second residual data that is a result of performing directional intra-prediction on the third block by adding the third residual data and the first residual data; and
an enhancement-layer decoding unit which restores the third block using the second residual data.

31. The video decoder of claim 30, wherein the first residual data is a difference value between the first block and a second block that the first block refers to according to the directional intra-prediction, and comprises directional information of the second block.

32. The video decoder of claim 30, wherein the second residual data is a difference value between the third block and a fourth block that the third block refers to according to the directional intra-prediction, and comprises directional information of the fourth block.

33. The video decoder of claim 30, wherein the third residual data comprises a difference between directional information included in the first residual data and directional information included in the second residual data.

34. The video decoder of claim 30, wherein the third residual data comprises information on a residual prediction mode that indicates the directional intra-residual prediction.

35. The video decoder of claim 30, wherein the third residual data comprises flag information that indicates whether to reuse directional information included in the first residual data.

36. The video decoder of claim 30, wherein the third residual data comprises flag information that indicates whether to adjust and use directional information included in the first residual data.

37. The video decoder of claim 30, wherein the first residual data and the second residual data are obtained with reference to the second block and the fourth block, respectively, and
wherein at least one of the second block and the fourth block exists in a third direction that is between a first direction and a second direction, which are adjacent to each other, for use in the directional intra-prediction.

38. The video decoder of claim 37, wherein the first and second directions are determined according to H.264 intra-prediction standard.

* * * * *